United States Patent Office 3,514,505
Patented May 26, 1970

---

3,514,505
METHYLCYCLOPENTYL PHOSPHATE AND PHOSPHONATE ESTERS
Gerald H. Peterson, 11972¾ Idaho,
West Los Angeles, Calif. 90025
No Drawing. Filed Aug. 28, 1967, Ser. No. 663,541
Int. Cl. C07f 9/08, 9/38; C09k 3/00
U.S. Cl. 260—958                    13 Claims

ABSTRACT OF THE DISCLOSURE

This invention relates to chemical compounds which are phosphate esters and phosphonate esters having three organic radicals at least one of which is the 1-methylcyclopentyl or the 2-methylcyclopentyl and the other organic radicals of which are the 1-methylcyclopentyl radical, the 2-methylcyclopentyl radical, the phenyl radical, or the tolyl radical.

These chemical compounds are useful for thermally stable fire resistant hydraulic fluids, especially for aircraft, either alone or admixed with other additives.

---

This invention relates to new chemical compounds which are phosphate esters and phosphonate esters having three organic radicals at least one of which is the 1-methylcyclopentyl or the 2-methylcyclopentyl and the other organic radicals of which are the 1-methylcyclopentyl radical. the 2-methylcyclopentyl radical, the phenyl radical, or the tolyl radical.

These new chemical compounds are useful for thermally stable fire resistant hydraulic fluids, especially for aircraft, either alone or admixed with other additives.

These compounds particularly include the following.

(1) Phosphate esters having the 1-methylcyclopentyl radical:

Tri-1-methlycyclopentyl phosphate
Di-1-methylcyclopentyl phenyl phosphate
Mono-1-methylcyclopentyl di-phenyl phosphate
Di-1-methylcyclopentyl tolyl phosphate
Mono-1-methylcyclopentyl di-tolyl phosphate
Mono-1-methylcyclopentyl tolyl phenyl phosphate (2) Phosphate esters having the 1-methylcyclopentyl radical:

Di-1-methylcyclopentyl 1-methylcyclopentane phosphonate
Di-1-methylcyclopentyl benzene phosphonate
Di-phenyl 1-methylcyclopentane phosphonate
Di-1-methylcyclopentyl toluene phosphonate
Di-tolyl 1-methylcyclopentane phosphonate
Mono-1-methylcyclopentyl tolyl benzene phosphonate
Mono-1-methylcyclopentyl phenyl toluene phosphonate (3) Phosphate esters having the 2-methylcyclopentyl radical:

Tri-2-methylcyclopentyl phosphate
Di-2-methylcyclopentyl phenyl phosphate
Mono-2-methylcyclopentyl di-phenyl phosphate
Di-2-methylcyclopentyl tolyl phosphate
Mono-2-methylcyclopentyl di-tolyl phosphate
Mono-2-methylcyclopentyl tolyl phenyl phosphate (4) Phosphonate esters having the 2-mthylcyclopentyl radical:

Di-2-methylcyclopentyl 2-methylcyclopentane phosphonate
Di-2-methylcyclopentyl benzene phosphonate
Di-phenyl 2-methylcyclopentane phosphonate
Di-2-methylcyclopentyl toluene phosphonate
Di-tolyl 2-methylcyclopentane phosphonate
Mono-2-methylcyclopentyl tolyl benzene phosphonate
Mono-2-methylcyclopentyl phenyl toluene phosphonate The 1-methylcyclopentyl radical is shown as follows:

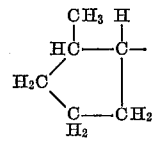

The 2-methylcyclopentyl radical is shown as follows:

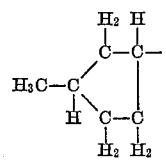

Each of these new foregoing chemical compounds can be made by the same methods used for making the corresponding phosphates and phosphonates where the butyl radical is used instead of the 1-methylcyclopentyl radical or the 2-methylcyclopentyl radical. The methods of making the corresponding phosphates and phosphonates with butyl radical are known to those skilled in the art, and with the disclosure herein those skilled in the art to which my invention appertains will be able to make and use the new chemical compounds of my invention.

The preparation of the known phosphate esters and phosphonate esters having the butyl radical instead of the 1-methylcyclopentyl radical or 2-methylcyclopentyl radical of my invention is disclosed in the books entitled "Introduction to Hydraulic Fluids" by Roger E. Hatton, published by Reinhold Publishing Corporation, "Organo-Phosphorous Compounds" by G. M. Kosolopoff, published by John Wiley and Sons, "Synthetic Lubricants" edited by Reigh C. Gunderson and Andrew W. Hart, published by Reinhold Publishing Corporation, New York, and numerous other publications and issued patents. The particular relevant disclosure in the book entitled "Introduction to Hydraulic Fluids" appears on pp. 190 through 195, and the particular relevant disclosure in the book entitled "Synthetic Lubricants" appears on pp. 103 through 150.

Even though those skilled in the art will be able to prepare and use the new chemical compounds of my inventions, there is given below examples of these compounds and their preparation.

EXAMPLE 1

Tri-1-methylcyclopentyl phosphate 3.5 mols of 1-methylcyclopentyl alcohol are added dropwise with stirring to 1 mol of phosphorus oxychloride (POCl$_3$) at 25–35° C. The temperature is slowly brought up to about 65° C. and the pressure is slowly reduced to 50 mm./Hg with stirring to remove hydrogen chloride. The mixture is then distilled and tri-1-methylcyclopentyl phosphate is collected.

EXAMPE 2

Tri-1-methylcyclopentyl phosphate

To 5 mols of 1-methylcyclopentanol, 3 mols of freshly cut metallic sodium are added in small cubes about ¼" with stirring and maintaining the temperature between 25 and 40° C. When reaction is complete as evidenced by cessation of bubbling, 1 mol of phosphorus oxychloride is added dropwise with stirring while maintaining the temperature at about 25–50° C. The reaction mixture is filtered to remove the precipitated sodium chloride and the filtrate is distilled and tri-1-methylcyclopentyl phosphate is collected.

EXAMPLE 3

Di-1-methylcyclopentyl phenyl phosphate 2 mols of 1-methylcyclopentanol are added dropwise with stirring to 1 mol of POCl₃ at 25–35° C. The temperature is slowly brought up to about 65° C. and the pressure slowly reduced to 50 mm./Hg to remove hydrogen chloride. Without further purification this mixture is added dropwise at 0–5° C. to a saturated solution of 1 mol of phenol in 1 mol of sodium hydroxide with good stirring. The mixture is allowed to rise in temperature to 25° C. with continued stirring. The resulting mixture is washed, dried and distilled to separate out the desired water insoluble di-1-methylcyclopentyl phenyl phosphate.

EXAMPLE 4

Di-1-methylcyclopentyl tolyl phosphate 2 mols of 1-methylcyclopentanol are added dropwise with stirring to 1 mol of POCl₃ at 25–35° C. The temperature is slowly brought up to about 65° C. and the pressure slowly reduced to 50 mm./Hg to remove hydrogen chloride. Without further purification this mixture is added dropwise at 0–5° C. to a saturated solution of 1 mol of meta-cresol in 1 mol of sodium hydroxide with good stirring. The mixture is allowed to rise in temperature to 25° C. with continued stirring. The resulting mixture is washed, dried and distilled to separate out the desired water insoluble di-1-methylcyclopentyl meta-tolyl phosphate.

EXAMPLE 5

Mono-1-methylcyclopentyl di-phenyl phosphate 1 mol of 1-methylcyclopentanol is added dropwise with stirring to 1 mol of POCl₃ at 25–35° C. The temperature is slowly brought up to about 65° C. and the pressure slowly reduced to 50 mm./Hg to remove hydrogen chloride. Without further purification this mixture is added dropwise at 0–5° C. to a saturated solution of 2 mols of phenol in 2 mols of NaOH with good stirring. The mixture is allowed to rise in temperature to 25° C. with continued stirring. The resulting mixture is washed, dried and distilled to separate out the desired water insoluble mono-1-methylcyclopentyl di-phenyl phosphate.

EXAMPLE 6

Mono-1-methylcyclopentyl para-tolyl phosphate 1 mol of 1-methylcyclopentanol is added dropwise with stirring to 1 mol of POCl₃ at 25–35° C. The temperature is slowly brought up to about 65° C. and the pressure slowly reduced to 50 mm./Hg to remove hydrogen chloride. Without further purification this mixture is added dropwise at 0–5° C. to a saturated solution of 2 mols of para-cresol in 2 mols of NaOH with good stirring. The mixture is allowed to rise in temperature to 25° C. with continued stirring. The resulting mixture is washed, dried and distilled to separate out the desired water insoluble mono-1-methylcyclopentyl para-tolyl phosphate.

EXAMPLE 7

Mono-1-methylcyclopentyl phenyl tolyl phosphate 1 mol of 1-methylcyclopentanol is added dropwise with stirring to 1 mol of POCl₃ at 25–35° C. The temperature is slowly brought up to about 65° C. and the pressure slowly reduced to 50 mm./Hg to remove hydrogen chloride. Without further purification this mixture is added dropwise at 0–5° C. to a saturated solution of 1 mol of phenol in 1 mol of sodium hydroxide with good stirring. The mixture is allowed to rise in temperature to 25° C. with continued stirring. The mixture is filtered and the filtrate is added dropwise, without further purification, at 0–5° C. to a saturated solution of 1 mol of meta-cresol in 1 mol of NaOH with good stirring. The mixture is allowed to rise in temperature with continued stirring. The resulting mixture is washed, dried and distilled to separate out the desired water insoluble mono-1-methylcyclopentyl phenyl meta-tolyl phosphate.

EXAMPLE 8

Di-1-methylcyclopentyl 1-methylcyclopentane phosphate 3 mols of 1-methylcyclopentanol are added dropwise with stirring to 1 mol of 1-methylcyclopentane phosphorus oxydichloride at 25–35° C. The temperature is slowly brought up to about 65° C. and the pressure is slowly reduced to 50 mm./Hg with stirring to remove hydrogen chloride. The mixture is then distilled and di-1-methylcyclopentyl 1-methylcyclopentane phosphate is collected.

EXAMPLE 9

Di-phenyl-1-methylcyclopentane phosphonate 3 mols of phenol are added dropwise with stirring to 1 mol of 1-methylcyclopentane phosphorus oxydichloride at 25–35° C. The temperature is slowly brought up to about 65° C. and the pressure is slowly reduced to 50 mm./Hg with stirring to remove hydrogen chloride. The mixture is then distilled and di-phenyl 1-methylcyclopentane phosphonate is collected.

EXAMPLE 10

Di-meta-tolyl 1-methylcyclopentane phosphonate 3 mols of meta-cresol are added dropwise with stirring to 1 mol of 1-methylcyclopentane phosphorus oxydichloride at 25–35° C. The temperature is slowly brought up to about 65° C. and the pressure is slowly reduced to 50 mm./Hg with stirring to remove hydrogen chloride. The mixture is then distilled and di-meta-tolyl 1-methylcyclopentane phosphonate is collected.

EXAMPLE 11

1-methylcyclopentyl meta-tolyl 1-methylcyclopentane phosphonate 1 mol of 1-methylcyclopentanol is added dropwise with stirring to 1 mol of 1-methylcyclopentane phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of 1 mol of meta-cresol in 1 mol of sodium hydroxide with good stirring. The mixture is allowed to rise in temperature to 25° C. with continued stirring. The resulting mixture is washed, dried and distilled to separate out the desired water insoluble 1-methylcyclopentyl meta-tolyl 1-methylcyclopentane phosphonate.

EXAMPLE 12

1-methylcyclopentyl phenyl 1-methylcyclopentane phosphonate 1 mol of 1-methyl cyclopentanol is added dropwise with stirring to 1 mol of 1-methylcyclopentane phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of 1 mol of phenol in 1 mol of sodium hydroxide with good stirring. The mixture is allowed to rise in temperature to 25° C. with continued stirring. The resulting mixture is washed, dried and distilled to separate out the desired water insoluble 1-methylcyclopentyl phenyl 1-methylcyclopentane phosphonate.

EXAMPLE 13

Di-1-methylcyclopentyl benzene phosphonate 3 mols of 1-methylcyclopentanol are added dropwise with stirring to 1 mol of benzene phenyl phosphorus oxydichloride at 25–35° C. The temperature is slowly brought up to about 65° C. and the pressure is slowly reduced to 50 mm./Hg with stirring to remove hydrogen chloride. The mixture is then distilled and di-1-methylcyclopentyl benzene phosphonate is collected.

EXAMPLE 14

Di-1-methylcyclopentyl toluene phosphonate 3 mols of 1-methylcyclopentanol are added dropwise with stirring to 1 mol of meta-toluene phosphorus oxydichloride at 25–35° C. The temperature is slowly brought up to about 65° C. and the pressure is slowly reduced to 50 mm./Hg with stirring to remove hydrogen chloride. The mixture is then distilled and di-1-methylcyclopentyl toluene phosphonate is collected.

EXAMPLE 15

1-methylcyclopentyl phenyl benzene phosphonate 1 mol of 1-methylcyclopentanol is added dropwise with stirring to 1 mol of benzene phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of 1 mol of phenol in one mol of sodium hydroxide with good stirring. The mixture is allowed to rise in temperature to 25° C. with continued stirring. The mixture is washed, dried, and distilled and 1-methylcyclopentyl phenyl benzene phosphonate is collected.

EXAMPLE 16

1-methylcyclopentyl meta-tolyl benzene phosphonate 1 mol of 1-methylcyclopentanol is added dropwise with stirring to 1 mol of benzene phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of 1 mol of meta-cresol in 1 mol of sodium hydroxide with good stirring. The mixture is allowed to rise in temperature to 25° C. with continued stirring. The mixture is washed, dried and distilled and 1-methylcyclopentyl meta-tolyl benzene phosphonate is collected.

EXAMPLE 17

1-methylcyclopentyl tolyl toluene phosphonate 1 mol of 1-methylcyclopentanol is added dropwise with stirring to 1 mol of meta-toluene phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of 1 mol of meta-cresol in 1 mol of sodium hydroxide with good stirring. This mixture is allowed to rise in temperature to 25° C. with continued stirring. The mixture is washed, dried and distilled and 1-methylcyclopentyl tolyl toluene phosphonate is collected.

EXAMPLE 18

1-methylcyclopentyl phenyl toluene phosphonate 1 mol of 1-methylcyclopentanol is added dropwise with stirring to 1 mol of meta-toluene phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of 1 mol of phenol in 1 mol of sodium hydroxide with good stirring. This mixture is allowed to rise in temperature to 25° C. with continued stirring. The mixture is washed, dried and distilled and 1-methylcyclopentyl phenyl toluene phosphonate is collected.

EXAMPLE 19

Tolyl phenyl 1-methylcyclopentane phosphonate 1 mol of meta-cresol is added dropwise with stirring to 1 mol of 1-methylcyclopentane phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of 1 mil of phenol in 1 mol sodium hydroxide with good stirring. This mixture is allowed to rise in temperature to 25° C. with continued stirring. The mixture is washed, dried and distilled and tolyl phenyl 1-methylcyclopentane phosphonate is collected.

The foregoing examples illustrate the phosphonate and phosphonate esters of my invention with the 1-methylcyclopentyl radical. It will be understood of course in each of the foregoing examples the 2-methylcyclopentyl radical may be used instead of the 1-methylcyclopentyl radical.

The compositions of my invention have high thermal stability apparently due to the presence of the 1-methylcyclopentyl radical or the 2-methylcyclopentyl radical, high fire resistance, good lubricity, especially hydrodynamic lubricity, good boundary lubrication and good antiwear, have ability to lubricate moving parts, particularly steel on steel, good viscosity and viscosity-temperature properties, and are readily admixed with many additives.

I claim:

1. The phosphate and phosphonate esters represented by the formula $(R_1R_2R_3)O_2O_xPO$ in which $x$ may be one or zero, $R_1$ is 1-methylcyclopentyl or 2-methylcyclopentyl, and $R_2$ and $R_3$ are 1-methylcyclopentyl, 2-methylcyclopentyl, phenyl, or tolyl.
2. The chemical compound as defined in claim 1 which is tri-methylcyclopentyl phosphate.
3. The chemical compound as defined in claim 1 which is di-methylcyclopentyl methylcyclopentane phosphonate.
4. The chemical compound as defined in claim 1 which is di-methylcyclopentyl phenyl phosphate.
5. The chemical compound as defined in claim 1 which is di-methylcyclopentyl benzene phosphonate.
6. The chemical compound as defined in claim 1 which di-methylcyclopentyl tolyl phosphonate.
7. The chemical compound as defined in claim 1 which is mono-methylcyclopentyl di-phenyl phosphate.
8. The chemical compound as defined in claim 1 which is mono-methylcyclopentyl phenyl benzene phosphonate.
9. The chemical compound as defined in claim 1 which is mono-methylcyclopentyl di-tolyl phosphate.
10. The chemical compound as defined in claim 1 which is mono-methylcyclopentyl tolyl toluene phosphonate.
11. The chemical compound as defined in claim 1 which is mono-methylcyclopentyl tolyl phenyl phosphate.
12. The chemical compound as defined in claim 1 which is mono-methylcyclopentyl tolyl benzene phosphonate.
13. The chemical compound as defined in claim 1 which is mono-methylcyclopentyl phenyl toluene phosphonate.

References Cited

UNITED STATES PATENTS

| | | | |
|---|---|---|---|
| 1,959,228 | 5/1934 | Blagden et al. | 260—958 XR |
| 2,682,522 | 6/1954 | Coover et al. | 260—958 XR |

CHARLES B. PARKER, Primary Examiner

A. H. SUTTO, Assistant Examiner

U.S. Cl. X.R.

260—973, 974; 252—78